United States Patent [19]
Ogata et al.

[11] Patent Number: 5,570,335
[45] Date of Patent: Oct. 29, 1996

[54] REPRODUCING WAVEFORM CORRECTION CIRCUIT FOR OPTICAL INFORMATION RECORDING/REPRODUCING SYSTEM

[75] Inventors: Takashi Ogata, Hachioji; Junichi Nakano, Hino, both of Japan

[73] Assignee: Olympus Optical Co., Ltd., Tokyo, Japan

[21] Appl. No.: 443,442

[22] Filed: May 18, 1995

[30] Foreign Application Priority Data

May 23, 1994 [JP] Japan ................................. 6-108550
Jun. 2, 1994 [JP] Japan ................................. 6-121369

[51] Int. Cl.⁶ .................................................. G11B 7/00
[52] U.S. Cl. ........................ 369/124; 369/106; 369/59; 369/44.41; 360/39; 360/72.1
[58] Field of Search ............................... 369/116, 110, 369/106, 34, 54, 58, 59, 124, 44.41; 360/39, 62, 69, 72.1; 364/736, 746

[56] References Cited

U.S. PATENT DOCUMENTS

| | | | |
|---|---|---|---|
| 3,882,540 | 5/1975 | Ottesen | 360/39 |
| 5,181,195 | 1/1993 | Kume et al. | 369/44.41 |
| 5,267,095 | 11/1993 | Hasegawa et al. | 360/39 |
| 5,450,255 | 9/1995 | Arisaka | 360/72.1 |

FOREIGN PATENT DOCUMENTS 61-39236  2/1986  Japan.
4-95275   3/1992  Japan.

OTHER PUBLICATIONS

Chapter V of "Digital Communication Technology" pp. 158–161, Kimio Tanaka, Tokai Daigaku Shuppankai, Digital Technology Series 8, Dated Mar. 25, 1986.

Primary Examiner—Loha Ben
Attorney, Agent, or Firm—Frishauf, Holtz, Goodman, Langer & Chick

[57] ABSTRACT

According to an aspect, to realize a transient correction circuit capable of performing a high-speed operation without being affected by low-frequency noise and allow to remove only the low-frequency noise without changing a reproducing waveform, an output from a HPF for removing the low-frequency noise of a reproduced signal is supplied to a waveform correction circuit for correcting the transient of the reproduced signal, which is generated by the HPF. The waveform correction circuit is constituted by a LPF, an adder for adding an output from the LPF and the output from the HPF, and a quantization circuit for quantizing an output from the adder. The HPF and the LPF have the same time constant. According to another aspect, to precisely compensate a DC component necessary for signal reproduction, which is lost by capacitive coupling, in reproduction of a signal recorded by high-density or high-transfer recording, the low-frequency component of the reproduced signal is removed by a HPF corresponding to a coupling capacitor. A comparison circuit compares an output from the HPF with a predetermined reference level by a comparator, thereby generating a binary output. A LPF performs time integration of the binary output through a gain adjustment circuit. An output whose sag is corrected is calculated by an operational amplifier according to the output from the LPF and the HPF.

18 Claims, 8 Drawing Sheets

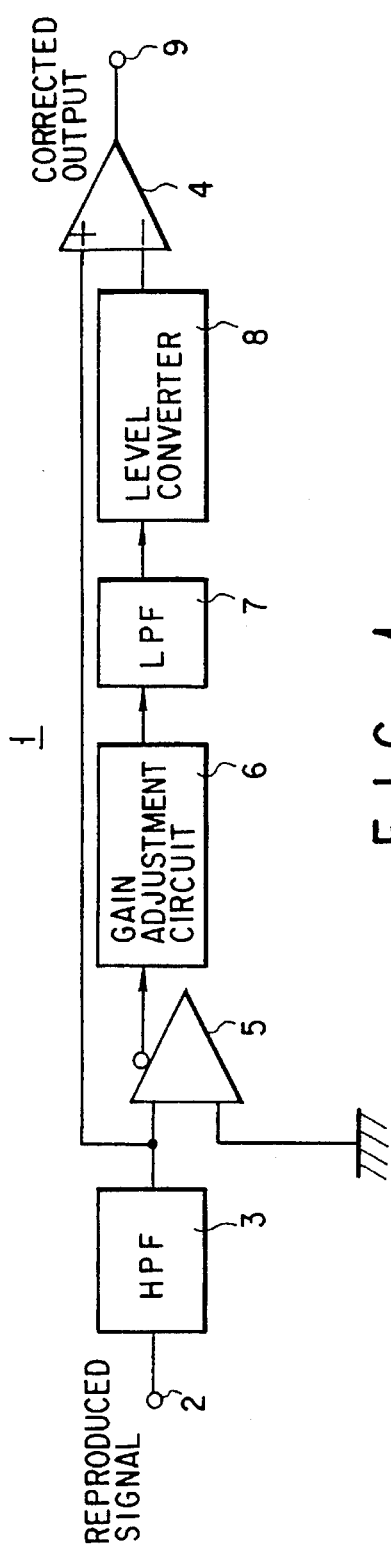
FIG. 1
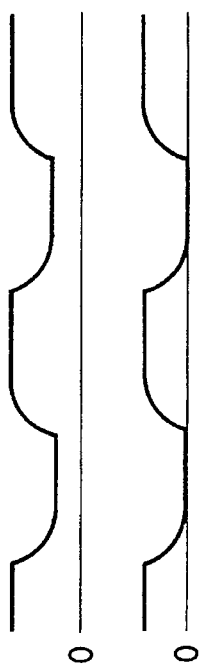
FIG. 2D
FIG. 2E
FIG. 2F
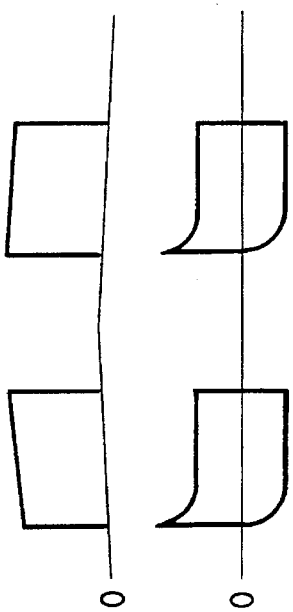
FIG. 2A
FIG. 2B
FIG. 2C

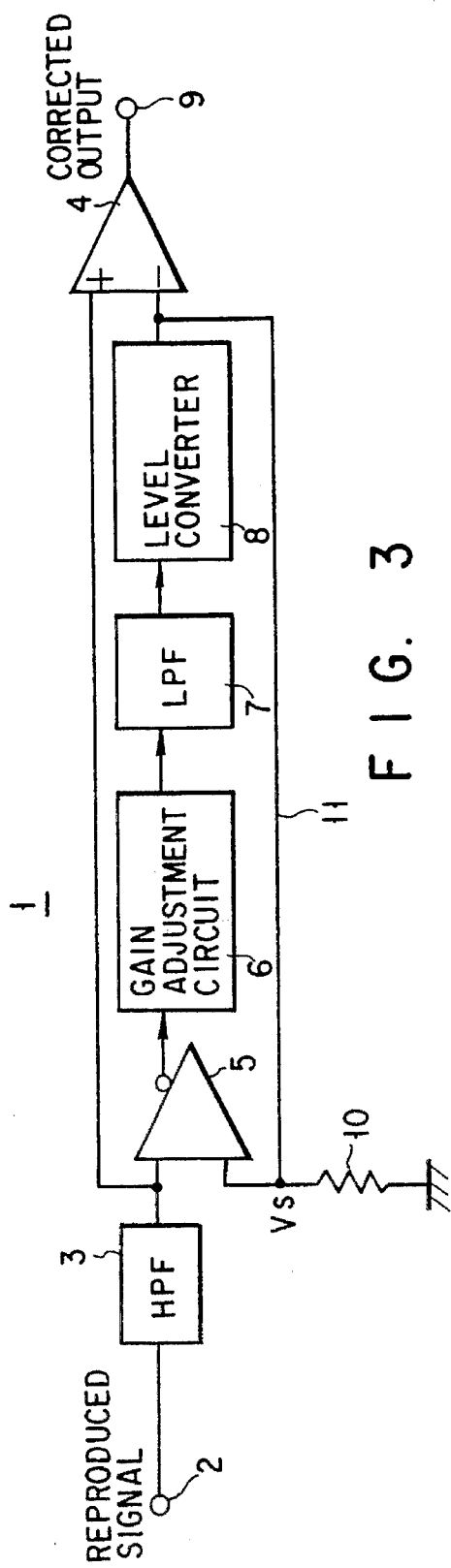
F I G. 3
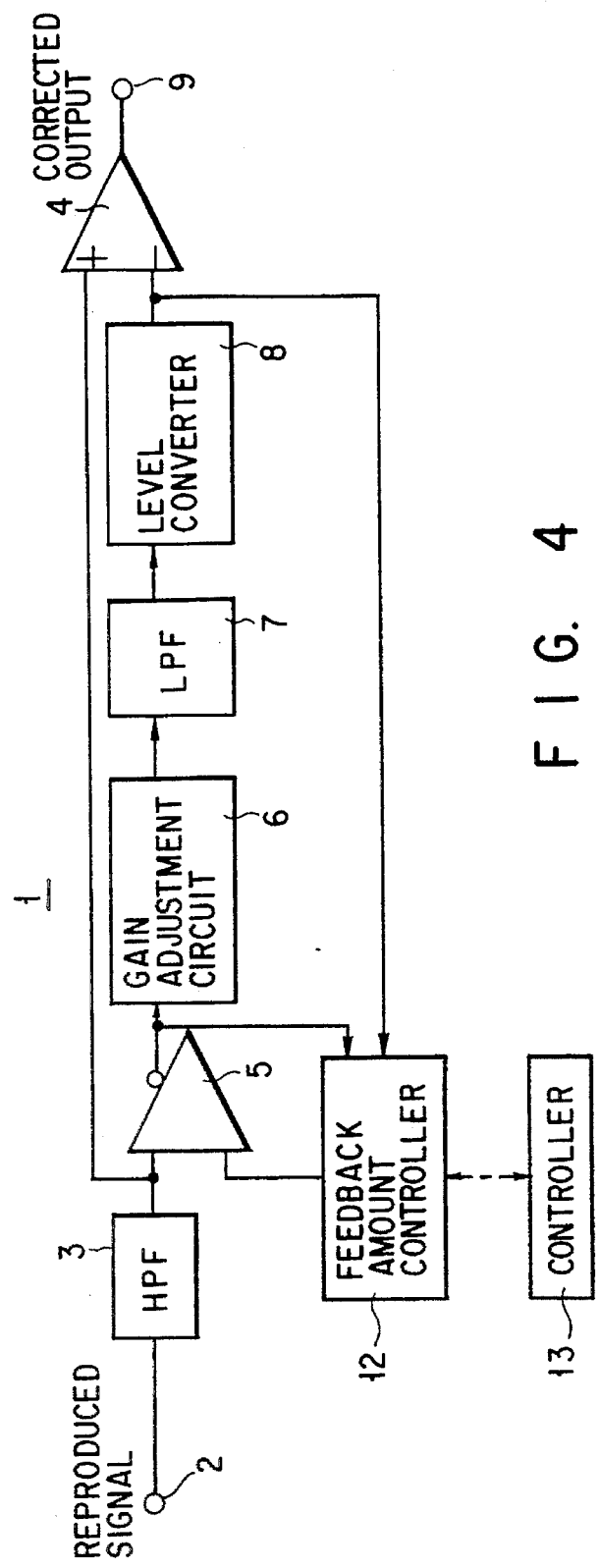
F I G. 4

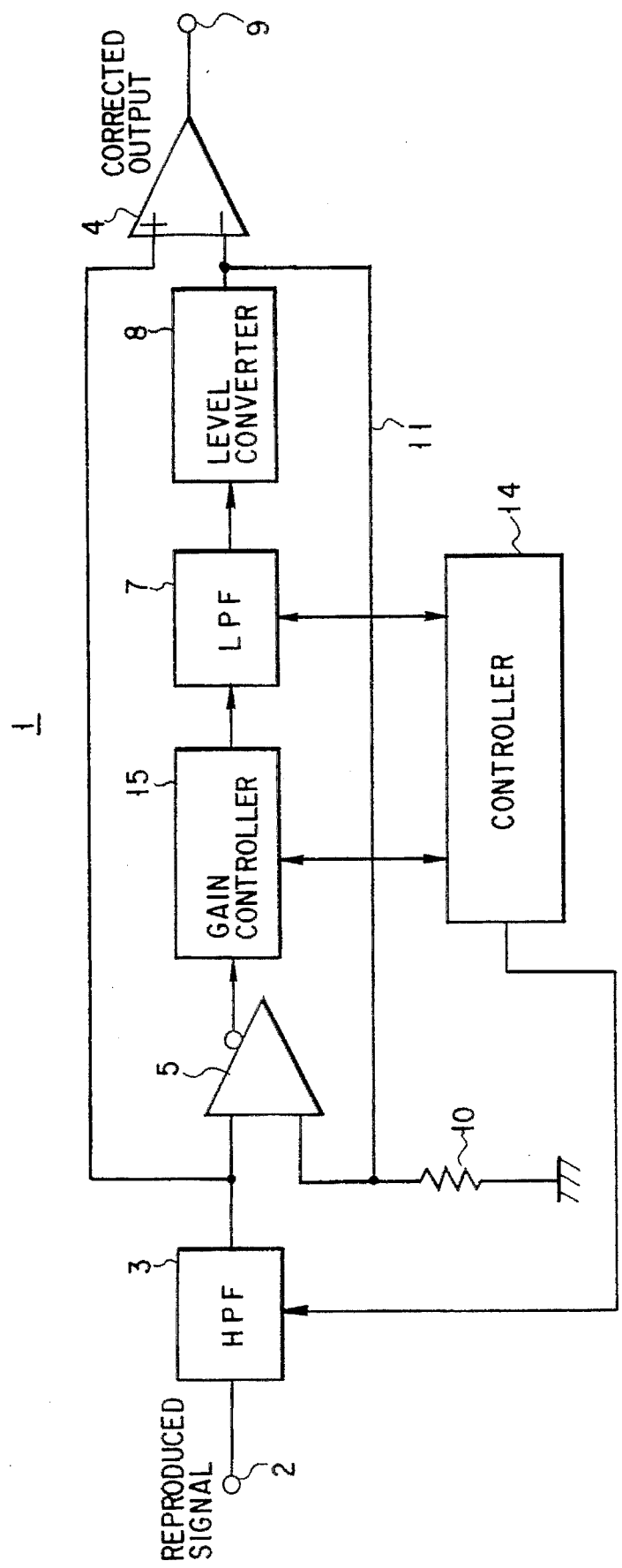
F I G. 5

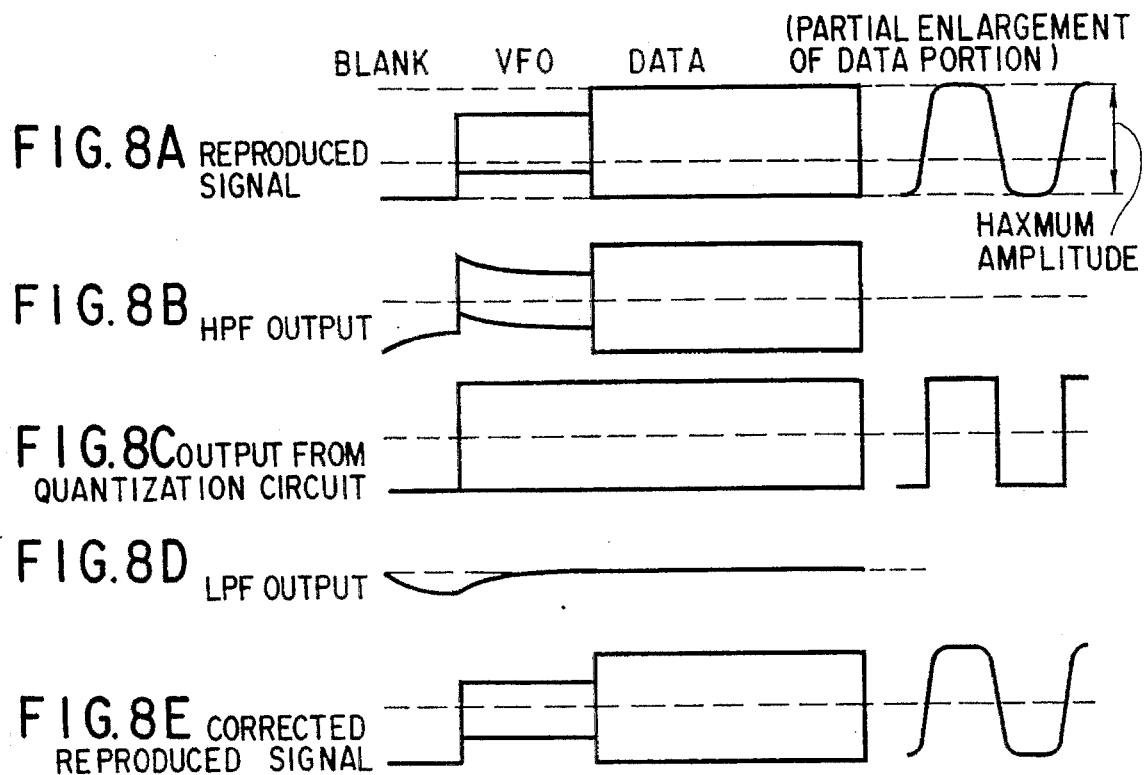
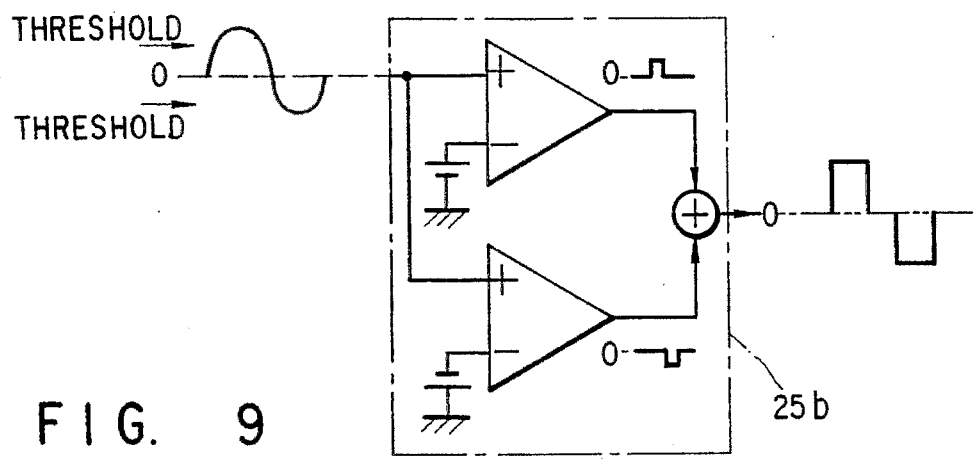
FIG. 9

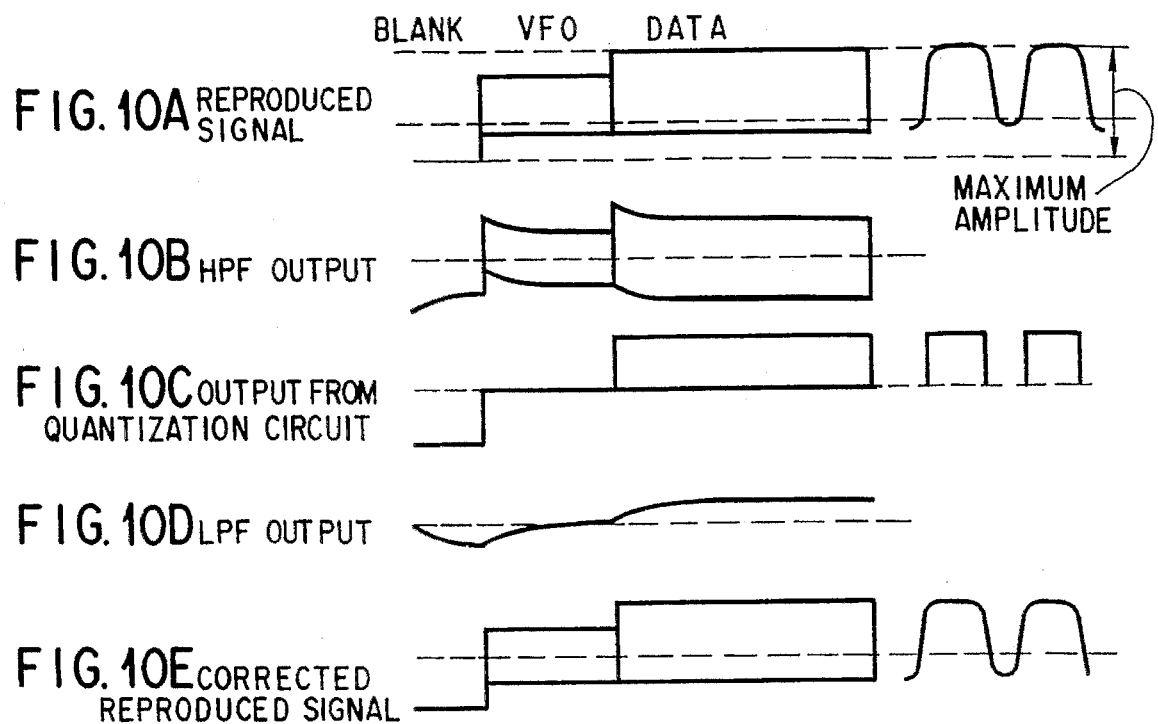
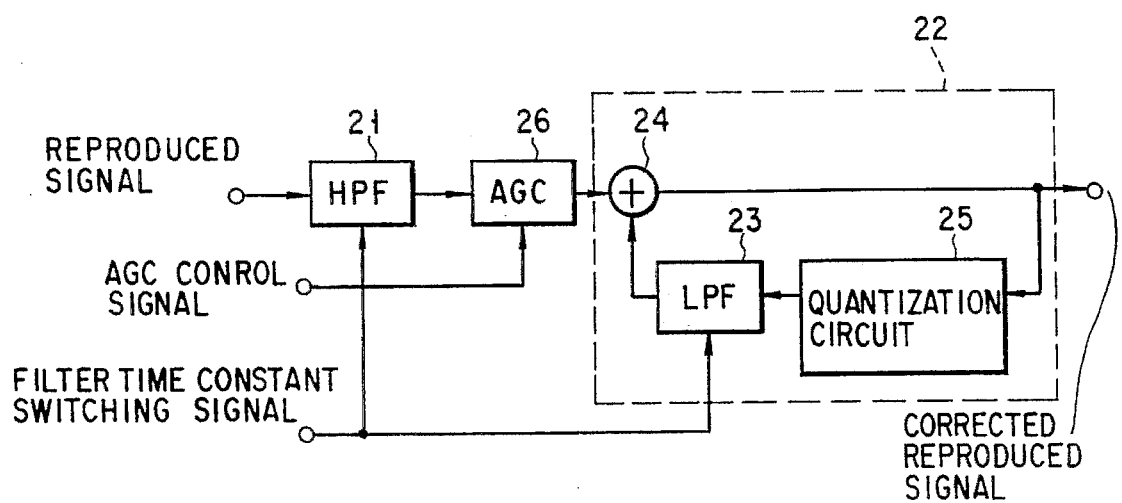

F I G. 12A  REPRODUCED SIGNAL 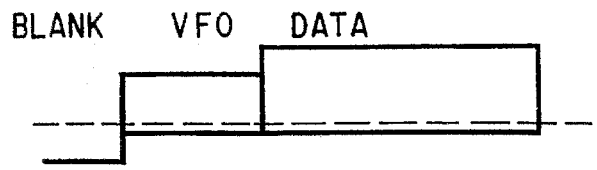
F I G. 12B  HPF OUTPUT 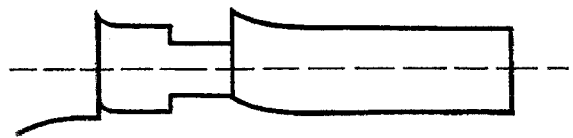
F I G. 12C  FILTER TIME CONSTANT SWITCHING SIGNAL 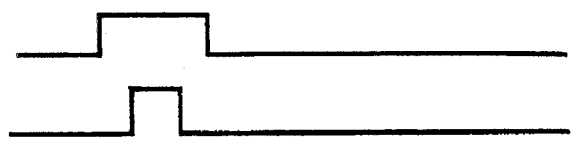
F I G. 12D  AGC CONTROL SIGNAL 
F I G. 12E  OUTPUT FROM QUANTIZATION CIRCUIT 
F I G. 12F  AGC OUTPUT
F I G. 12G  CORRECTED REPRODUCED SIGNAL 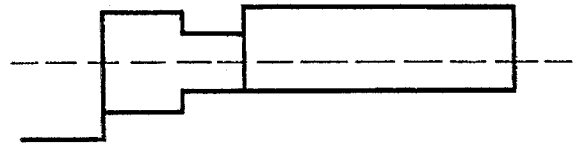
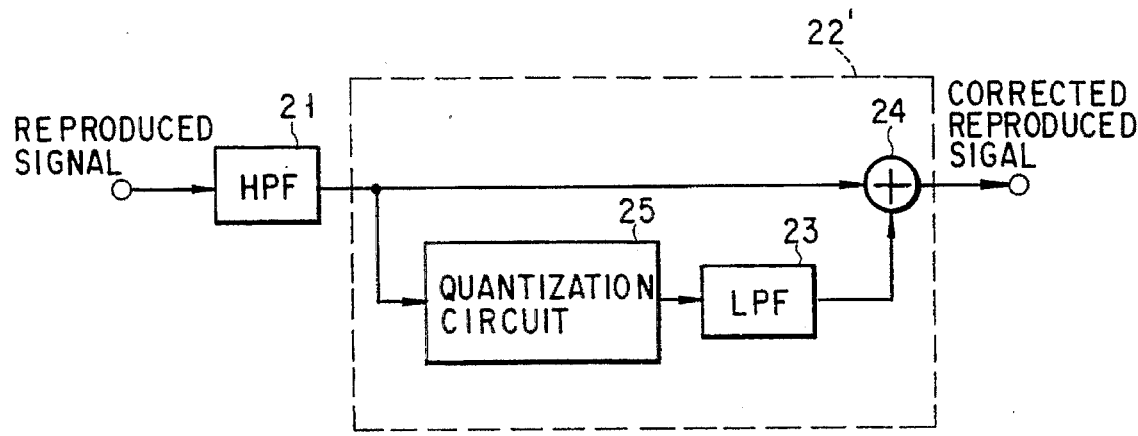
F I G. 13

REPRODUCING WAVEFORM CORRECTION CIRCUIT FOR OPTICAL INFORMATION RECORDING/REPRODUCING SYSTEM

BACKGROUND OF THE INVENTION

1. Field of the Invention

The present invention generally relates to an optical information recording/reproducing system and, more particularly, to a magneto-optical reproducing apparatus having a reproducing waveform correction circuit used for high-density or fast-transfer recording, and a signal reproducing apparatus for an optical disk device, which reproduces an information signal from an optical disk in which data is recorded by mark edge recording.

2. Description of the Related Art

A mark length recording method in which information is recorded at a mark edge is conventionally known as a method for realizing high-density recording in an magneto-optical disk.

In this method, when a recording signal is to be reproduced from a magneto-optical disk, a reproduced signal is binarized at a fixed slice level to detect an edge position. At the same time, a reproducing clock determined by a modulation method is detected to determine a pattern "0" or "1" from a timing relationship with a data detection window, thereby reproducing information.

In this information reproduction, DC variations according to envelop variations of the reproduced signal may be caused due to birefringence of the substrate of the magneto-optical disk. For this reason, the reproducing apparatus of this type uses a capacitance-coupled amplifier corresponding to a high-pass filter as an amplifier to suppress the DC variation component, thereby reproducing the information.

However, in the reproduced signal output from such a capacitance-coupled amplifier corresponding to a high-pass filter, a change in DC level between the ID area of the preformat area having information of the address or track number of the data in advance and the recording data area, or a change in DC level depending on the pattern of the recording data is also suppressed. For this reason, when the reproduced signal is binarized by the fixed slice method, the data may be erroneously read.

That is to say, since the low-frequency component in the reproduced signal is lost, baseline variations are caused to generate a transient in the signal passing through the high-pass filter. This transient is prominent at a portion between the blank portion of the ID portion at the sector head and the VFO portion as the recording portion.

In mark position recording, differential detection in which the reproduced signal is binarized by peak detection is performed, so the low-frequency component is not necessary, and the transient does not pose a serious problem.

However, when data recorded by mark edge recording is to be binarized by the DC slice method, the reproduced signal cannot be accurately binarized because of the transient due to the data pattern at the sector head or in the sector.

Therefore, a method in which the envelope of the reproducing waveform is detected to compensate the reproducing waveform is conventionally used as a means for restoring the DC component necessary for data reproduction, which is lost by capacitive coupling, and correcting the reproducing waveform.

Jpn. Pat. Appln. KOKAI Publication No. 61-39236 discloses a correction circuit for correcting a reproducing waveform. FIG. 14 is a block diagram showing the basic arrangement of this correction circuit. A reproduced signal is directly supplied to an arithmetic circuit 64 through a coupling capacitor 61 corresponding to a high-pass filter. At the same time, a result obtained when half-wave rectification of the reproduced signal is performed by a half-wave rectifier 62, and thereafter, envelope detection of the reproduced signal is performed by an envelope detector 63. The result is supplied to the arithmetic circuit 64.

When a reproduced signal having a low-frequency swell as shown in FIG. 15A is supplied to the correction circuit with the above arrangement, the low-frequency swell is removed through the coupling capacitor 61 corresponding to a high-pass filter, resulting in a waveform as shown in FIG. 15B. In this case, the reproduced signal passing through the coupling capacitor 61 has a waveform from which a DC component necessary for reproduction is lost.

The waveform shown in FIG. 15B, which is obtained through the coupling capacitor 61, is rectified by the half-wave rectifier 62, as shown in FIG. 15C. When time integration of this rectified waveform is performed by a low-pass filter of the envelope detector 63, a DC component as shown in FIG. 15D is reproduced by envelope detection of the base side of the waveform shown in FIG. 15C.

The output shown in FIG. 15D, which is obtained upon envelope detection by the envelope detector 63, and the output shown in FIG. 15B, which is obtained through the coupling capacitor 61, are sent to the arithmetic circuit 64. When the two outputs are added in opposite polarities, a waveform shown in FIG. 15E, which has the corrected DC component, can be obtained.

According to the correction circuit using envelope detection, however, there is a time delay due to the integration time constant for time integration of the rectified waveform through the low-pass filter of the envelope detector 63, in addition to a response delay of the diode in rectification by the half-wave rectifier 62. For this reason, correction of the reproducing waveform by the arithmetic circuit 64 may be delayed.

Such a time delay poses no problem when the reproduced signal has a low frequency. However, in high-density or fast-transfer recording at a high reproducing/recording frequency, this time delay largely affects the correction waveform. As shown in FIG. 15F, the corrected waveform has a large sag at the data start portion immediately subsequent to the blank portion. For this reason, the waveform may be insufficiently corrected while containing an envelope distortion due to the time delay even in the middle of data.

For this reason, this method cannot be applied to a device such as a recent magneto-optical disk device with a high transfer rate and a high operation speed.

Conventionally, to minimize the time delay, a diode with a high response speed is used, or the filter time constant is decreased. Even with a high-speed diode, however, it is difficult to obtain ideal rectifying performance because the parasitic capacitance of the diode influences a signal having a high frequency of several tens MHz. In addition, when the filter time constant is decreased to heighten the cutoff frequency, the DC component cannot be sufficiently extracted in envelope detection. Furthermore, when the time constant is sufficiently larger than the signal period, the envelope cannot be accurately detected.

On the other hand, as a waveform correction method without using envelope detection, a method called "quantization feedback" is introduced in chapter V of "Digital Communication Technology" pp 158–161 (Kimio Tanaka, Tokai Daigaku Shuppan). In this method, however, the signal is reproduced while including the low-frequency noise which is supposed to be removed.

A circuit called an AGC (Auto Gain Control) for the purpose of aligning the amplitude of the reproduced signal is arranged for a magneto-optical disk. Jpn. Pat. Appln. KOKAI Publication No. 4-95275 discloses a method in which the amplitude of the reproduced signal in the VFO portion at the sector head is detected by envelope detection to control the gain of the gain control amplifier, and the gain at the end of the VFO portion is held in the data portion subsequent to the VFO portion.

SUMMARY OF THE INVENTION

The present invention has been made in consideration of the above situations, and has as its object to provide a magneto-optical reproducing apparatus having a reproducing waveform correction circuit capable of precisely compensating a DC component necessary for signal reproduction, which is lost by capacitive coupling, even when a signal recorded by high-density or fast-transfer recording is to be reproduced by high-speed operation.

It is another object of the present invention to provide a signal reproducing apparatus for a magneto-optical disk device, which can realize a transient correction circuit capable of performing a high-speed operation without being affected by low-frequency noise and having a high correction capability and at the same time realizes a transient correction circuit capable of further stably operating independently of a data pattern.

According to a first aspect of the present invention, there is provided a magneto-optical recording apparatus having a reproducing waveform correction circuit, comprising:

a high-pass filter for removing a low-frequency component of a signal reproduced from a recorded signal, comparison means for comparing an output from the high-pass filter with a predetermined reference level, thereby generating a quantization output, a low-pass filter for performing time integration of the quantization output generated by the comparison means, and arithmetic means for arithmetically operating a correction output according to outputs from the high-pass filter and the low-pass filter.

According to a second aspect of the present invention, there is provided a magneto-optical reproducing apparatus having a reproducing waveform correction circuit, comprising:

a high-pass filter for removing a low-frequency component of a signal reproduced from a recording medium, comparison means for comparing an output from the high-pass filter with a predetermined reference level, thereby generating a binary output, a low-pass filter for performing time integration of the binary output generated by the comparison means, and arithmetic means for arithmetically operating a correction output according to outputs from the high-pass filter and the low-pass filter.

According to a third aspect of the present invention, there is provided a signal reproducing apparatus for an optical disk device, which reproduces an information signal from an optical disk in which data is recorded by mark edge recording such that a mark edge portion is caused to correspond to information "1", and a sector as a unit of recording/reproduction of the data is constituted by a first recording portion in which a specific pattern is recorded and a second recording portion in which information is recorded, comprising:

a high-pass filter for shielding a low-frequency component of a reproduced signal, and waveform correction means, constituted by quantization means for quantizing a value of the reproduced signal, and a low-pass filter having substantially the same time constant as that of the high-pass filter, for correcting a transient of the reproduced signal, which is generated by the high-pass filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram schematically showing the arrangement of the first embodiment of the present invention;

FIGS. 2A to 2F are waveform charts for explaining the first embodiment;

FIG. 3 is a block diagram schematically showing the arrangement of the second embodiment of the present invention;

FIG. 4 is a block diagram schematically showing the arrangement of the third embodiment of the present invention;

FIG. 5 is a block diagram schematically showing the arrangement of the fourth embodiment of the present invention;

FIGS. 8A to 8E are charts showing operational waveforms at the respective portions of the signal reproducing apparatus in FIG. 6;

FIG. 9 is a circuit diagram showing the arrangement of a quantization circuit according to the sixth embodiment of the present invention;

FIGS. 10A to 10E are charts showing the operational waveforms of the signal reproducing apparatus according to the sixth embodiment;

FIG. 11 is a block diagram of a signal reproducing apparatus for performing AGC according to the seventh embodiment of the present invention;

FIGS. 12A to 12G are charts showing operational waveforms at the respective portions of the signal reproducing apparatus with the arrangement in FIG. 11;

FIG. 13 is a block diagram showing the arrangement of a signal reproducing apparatus according to the eighth embodiment of the present invention;

Detailed Description of the Preferred Embodiments

Figure 6:
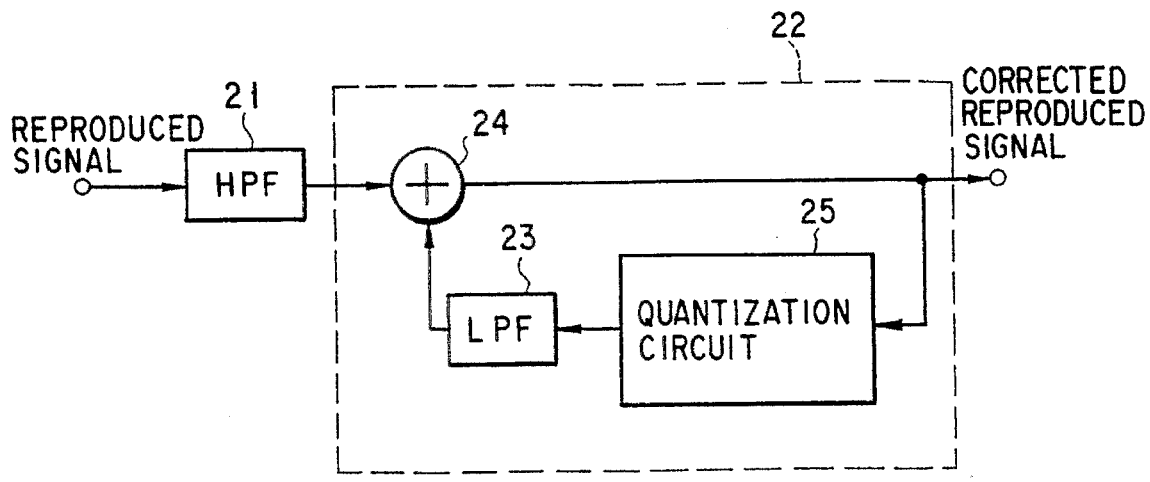
FIG. 6 is a block diagram showing the arrangement of a signal reproducing apparatus for a magneto-optical disk device according to the fifth embodiment of the present invention.

Reference will now be made in detail to the presently preferred embodiments of the invention as illustrated in the accompanying drawings, in which like reference characters designate like or corresponding parts throughout the several drawings.

The first to fourth embodiments of the present invention will be described below with reference to the accompanying drawings.

(First Embodiment)

FIG. 1 is a block diagram schematically showing the arrangement of a reproducing waveform correction circuit applied to a magneto-optical reproducing apparatus according to the present invention.

Referring to FIG. 1, reference numeral 1 denotes a reproducing waveform correction circuit. This reproducing waveform correction circuit 1 has a high-pass filter (HPF) 3 connected to an input terminal 2 to which the waveform of a signal reproduced by a magneto-optical disk reproducing apparatus (not shown) is applied. The high-pass filter 3 corresponds to the above-described coupling capacitor.

The output terminal of the high-pass filter 3 is connected to one input terminal of an operational amplifier 4 and at the same time connected to one input terminal of a comparator 5.

The comparator 5 compares an output from the high-pass filter 3 with a reference value (ground level), thereby generating a binary output.

The output terminal of the comparator 5 is connected to the other input terminal of the operational amplifier 4 through a gain adjustment circuit 6, a low-pass filter (LPF) 7, and a level converter 8.

In this case, the gain adjustment circuit 6 adjusts the output amplitude from the comparator 5. The low-pass filter 7 performs time integration of an output from the gain adjustment circuit 6, thereby removing a high-frequency component. The level converter 8 corrects the DC (direct current) level of an output from the low-pass filter 7. The operational amplifier 4 subtracts an output from the level converter 6 from an output from the high-pass filter 3, thereby generating a correction output to an output terminal 9.

The operation of the first embodiment with the above arrangement will be described below.

When a reproduced signal having a low-frequency swell as shown in FIG. 2A is supplied to the input terminal 2, the signal passing through the high-pass filter 3 corresponding to capacitive coupling is output as a waveform removed with DC and low-frequency components and including a large sag, as shown in FIG. 2B.

The output from the high-pass filter 3 is supplied to the comparator 5, compared with the reference value (ground zero level), and binarized and inverted. In addition, the amplitude of the binary signal is adjusted, and a binary output shown in FIG. 2C is generated. As for the binary output from the comparator 5, an inverted output at high level is obtained when the input signal from the high-pass filter 3 has a level lower than zero level.

The amplitude of the binary output from the comparator 5 is adjusted by the gain adjustment circuit 6. The binary output is supplied to the low-pass filter 7 to remove a high-frequency component. At this time, time integration is performed by the low-pass filter 7, and a waveform as shown in FIG. 2D is output.

When the filter time constant of the low-pass filter 7 is set almost equal to that of the above-described high-pass filter 3, and the amplitude of the binary output is appropriately set, the output from the low-pass filter 7 has a waveform obtained upon extraction of the sag component of the filter output from the high-pass filter 3, which is shown in FIG. 2B.

The output from the comparator 5 is generally a logic level output. The signal passing through the low-pass filter 7 is a waveform having a DC offset. In this case, however, when the output from the low-pass filter 7 is supplied to the level converter 8, the DC level is corrected, and a waveform output shown in FIG. 2E is obtained.

The signal passing through the level converter 8 is sent to the operational amplifier 4 and subtracted from the signal having the waveform shown in FIG. 2B, which has passed through the high-pass filter 3. As a result, an output whose sag generated by the high-pass filter 3 is corrected is obtained, as shown in FIG. 2F.

Therefore, according to the reproducing waveform correction circuit 1 with the above arrangement, the signal blank portion where a sag tends to be generated through the high-pass filter 3 corresponding to a coupling capacitor for the reproduced signal can be detected by the comparator 5 having a high response speed. At the same time, when the blank portion is inverted, and time integration is performed by the low-pass filter 7, an envelope signal almost equal to the sag can be obtained. In the conventional envelope detection method, an analog waveform signal is obtained by rectifying the reproducing waveform. To the contrary, in this embodiment, a digital output waveform is obtained upon binarization of a binary output from the comparator 5. For this reason, edges before and after the blank portion have rising and falling speeds (about nsec) corresponding to a digital signal, and a signal having a response speed higher than that of an analog signal by 100 times or more can be obtained.

With this arrangement, response of time integration by the low-pass filter at the subsequent stage is also accelerated. When the output from the comparator 5 is adjusted, the waveform obtained upon time integration is apparently close to that corrected in real time. Even for a high-frequency signal, the DC component necessary for signal reproduction, which is lost by capacitive coupling, can be precisely corrected in real time.

(Second Embodiment)

FIG. 3 is a block diagram schematically showing the arrangement of a reproducing waveform correction circuit according to the second embodiment of the present invention. The same reference numerals as in FIG. 1 denote the same parts in FIG. 3.

In this case, the other input terminal of a comparator 5 is connected to ground through a resistor 10. The output terminal of a level converter 8 is connected to the other input terminal of the comparator 5 through a line 11 such that a sag signal component obtained upon level conversion by the level converter 8 in accordance with an output from a low-pass filter 7 can be fed back as the reference level of the comparator 5.

The remaining arrangement is the same as in FIG. 1.

The sag signal component obtained upon level conversion by the level converter 8 in accordance with the output from the low-pass filter 7 is fed back as the reference level of the comparator 5. This feedback acts as so-called positive feedback in which the output obtained upon level conversion by the level converter 8 is increased, the reference level of the comparator 5 is also increased, the pulse width of the inverted output from the comparator 5 is also increased, and at the same time, the output from the low-pass filter 7 is also increased. Therefore, the reproducing waveform correction circuit according to the second embodiment operates such that, even when a large sag is generated immediately after the signal blank portion, a component which cannot be followed by the reference level of the comparator 5 because of the system delay is corrected, and the reference level always follows the envelope of the reproducing waveform passing through the high-pass filter 3. As a result, according to the second embodiment, a large sag can be further precisely corrected as compared to the first embodiment.

(Third Embodiment)

FIG. 4 is a block diagram schematically showing the arrangement of a reproducing waveform correction circuit according to the third embodiment of the present invention. The same reference numerals as in FIG. 1 denote the same parts in FIG. 4.

In this case, a feedback mount controller 12 is connected to the other input terminal of a comparator 5.

The feedback amount controller 12 supplies a sag signal component obtained upon level conversion by a level converter 8 to the comparator 5 as a feedback amount. At the same time, the feedback amount controller 12 controls this feedback amount in accordance with the pulse width of an inverted output from the comparator 5. The feedback amount controller 12 monitors the output from the comparator 5 and detects a high or low-level fixing time of an output, which is longer than the length of a blank portion expected in normal magneto-optical disk reproduction, on the basis of a timing signal generated by a controller 13. Upon detection of an abnormality, the feedback amount is decreased or set to zero, thereby canceling the fixed state.

The remaining arrangement is the same as in FIG. 1.

The feedback amount controller 12 always detects the pulse width of the inverted output from the comparator 5. If the pulse width has a predetermined value, i.e., if the pulse width falls within a range of the length of the blank portion expected in normal magneto-optical disk reproduction, the sag signal component obtained upon level conversion by the level converter 8 is supplied to the comparator 5 as a feedback amount. If the pulse width falls outside the range of the length of the blank portion, the feedback amount to the comparator 5 is decreased or set to zero, thereby stopping the positive feedback operation.

More specifically, in the reproducing waveform correction circuit for performing positive feedback of this type, the positive feedback operation may run away depending on a signal pattern or a defect in disk, resulting in high- or low-level fixed state of the comparator output.

This state continues during the feedback operation, so normal reproduction cannot be performed. Therefore, the output from the comparator 5 is always monitored, and the high- or low-level fixing time of the output, which is longer than the length of the known blank portion between data is counted and detected on the basis of a clock signal (not shown) or the like, or detected on the basis of a timing signal of the data portion, which is generated by the controller 12. Upon detection of an abnormality, the feedback amount is decreased or set to zero, thereby canceling the fixed state.

As described above, when the feedback amount to the comparator 5 is controlled by the feedback amount controller 12, even a circuit having a feedback system allows a stable operation.

(Fourth Embodiment)

FIG. 5 is a block diagram schematically showing the arrangement of a reproducing waveform correction circuit according to the fourth embodiment of the present invention. The same reference numerals as in FIG. 3 denote the same parts in FIG. 5.

In this case, a controller 14 is arranged. The controller 14 can control an output amplitude from a comparator 5 by a gain controller 15. At the same time, the controller 14 can control the time constants of a high-pass filter 3 and a low-pass filter 7.

The gain controller 15 controls the output amplitude from the comparator 5 in accordance with the clock frequency or amplitude of a reproduced signal. In control of the time constant of the high-pass filter 3, the time constant is optimally set by the controller 14 in accordance with the clock frequency of the reproduced signal. In this case, an IC of a programmable filter capable of changing the filter frequency characteristics in accordance with a digital input is used as the high-pass filter 3.

In this embodiment, the controller 14 can control the output amplitude from the comparator 5 and the time constants of the filters 3 and 7. However, depending on the clock frequency or the filter time constant, only gain control can be performed to change the output amplitude from the comparator 5. In this case, an operation similar to changing the time constant of the low-pass filter 7 within a narrow range can be obtained by changing the inclination of a change in time of an output from the low-pass filter 7.

With this operation, when the clock of a signal to be recorded in the inner or outer circumference of the disk changes, as in a Z-CAV disk, inclination of a change in signal time after time integration by the low-pass filter 7 also changes. For this reason, optimal correction according to the recording frequency or amplitude can be performed. For example, every time the clock frequency changes on the basis of a clock signal or a timing signal obtained from the controller 14, a predetermined optimal set value of a DC output is obtained from the controller. Alternatively, a memory is arranged in the gain controller 15, thereby obtaining an optimal value. With such a method, a comparator output optimal for correction can be obtained. Even for a high-frequency reproduced signal, a DC component lost by capacitive coupling can be precisely corrected in real time, and binarization of reproducing data can be accurately performed by the slice method.

According to the first to fourth embodiments of the present invention, the following arrangements can be obtained.

(1) A magneto-optical reproducing apparatus having a reproducing waveform correction circuit, comprising a high-pass filter for removing a low-frequency component of a signal reproduced from a recording medium, a comparison means for comparing an output from the high-pass filter with a predetermined reference level, thereby generating a binary output, a low-pass filter for performing time integration of the binary output generated by the comparison means, and an arithmetic means for arithmetically operating a correction output according to the high-pass filter and the low-pass filter.

(2) A magneto-optical reproducing apparatus having a reproducing waveform correction circuit according to the arrangement (1), further comprising a means for feeding back the output from the low-pass filter as the reference level of the comparison means.

(3) A magneto-optical reproducing apparatus having a reproducing waveform correction circuit according to the arrangement (2), further comprising a means for decreasing a feedback amount as the reference level of the comparison means or setting the feedback amount to zero when an output level of the comparison means is set in the same level state during a predetermined time.

The first to fourth embodiments of the present invention also include the following aspects.

(1) A magneto-optical reproducing apparatus having a reproducing waveform correction circuit according to the above arrangement (1), further comprising a means for controlling an output amplitude from the comparison means or time constants of the high-pass filter and the low-pass filter on the basis of information of an amplitude or a frequency of the reproduced signal, or information recorded in a disk.

(2) A magneto-optical reproducing apparatus having a reproducing waveform correction circuit according to the above arrangement (1), wherein the arithmetic means is a means for arithmetically operating an output corresponding to a difference between the output from the high-pass filter and the output from the low-pass filter.

(3) A magneto-optical reproducing apparatus having a reproducing waveform correction circuit according to the above arrangement (1), further comprising a level correction means for correcting a DC level of the output from the low-pass filter.

(4) A magneto-optical reproducing apparatus having a reproducing waveform correction circuit according to the above arrangement (1), wherein the high-pass filter is constituted by a capacitor inserted in series with respect to the reproduced signal.

As described above, according to the first and second embodiments of the present invention, the low-frequency component of the signal reproduced from the recording medium is removed by the high-pass filter. At the same time, the comparison means compares the output from the high-pass filter with the predetermined reference level, thereby generating the binary output. The low-pass filter performs time integration of the binary output. The arithmetic means arithmetically operates the correction output from the outputs from the low-pass filter and the high-pass filter, thereby converting the binary output from the comparison means into a binary digital output. With this operation, the rising and falling speeds of the digital signal can be largely increased, and the response in time integration by the low-pass filter can also be accelerated. Therefore, even in reproduction of a signal recorded by high-density or fast-transfer recording, the DC component necessary for signal reproduction, which is lost by capacitive coupling, can be precisely corrected.

According to the third embodiment of the present invention, the output from the low-pass filter is fed back as the reference level of the comparison means. With this operation, the reference level of the comparison means can always follow the envelope of the reproduced signal passing through the high-pass filter, thereby further increasing the correction accuracy.

According to the fourth embodiment of the present invention, when the output level of the comparison means is set in the same level state during a predetermined time, the feedback amount as the reference level of the comparison means is decreased or set to zero. With this operation, a so-called fixed state in which the same level state continues can be properly detected and canceled, so that a stable operation can always be expected.

The fifth to eighth embodiments of the present invention will be described blow with reference to the accompanying drawings.

FIG. 6 is a block diagram showing the arrangement of a signal reproducing apparatus for a magneto-optical disk device according to the fifth embodiment of the present invention.

Referring to FIE. 6, a high-pass filter (HPF) 21 removes low-frequency noise from a reproduced signal. An output from the HPF 21 is supplied to a waveform correction circuit for 22 correcting the transient of the reproduced signal, which is generated by the HPF 21.

The waveform correction circuit 22 is constituted by a low-pass filter (LPF) 23, an adder 24 for adding an output from the LPF 23 and an output from the HPF 21, and a quantization circuit 25 for quantizing an output from the adder 24. Note that the HPF 21 and the LPF 23 have the same time constant (cutoff frequency).

Figure 7:
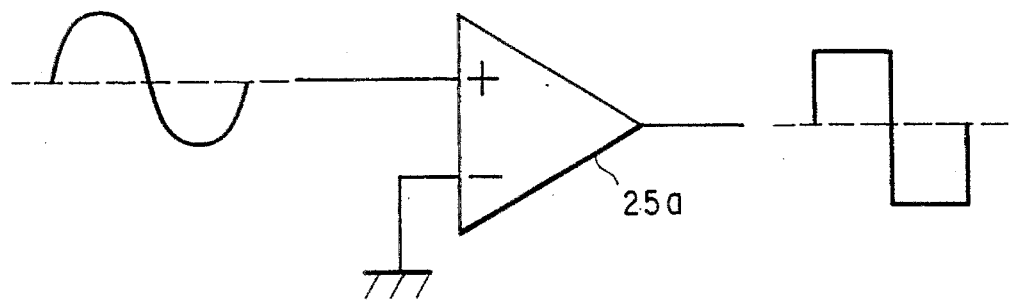
FIG. 7 is a circuit diagram showing the arrangement of a quantization circuit in FIG. 6.
Figure 14:
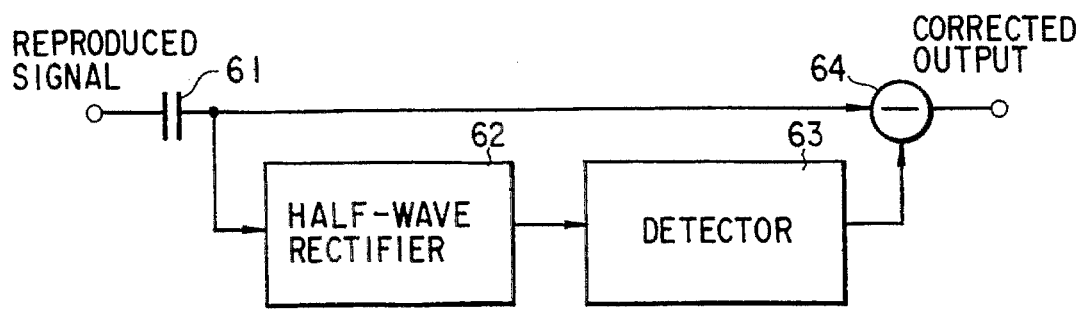
FIG. 14 is a block diagram schematically showing the arrangement of a conventional correction circuit for compensating a reproducing waveform.
Figure 15A:
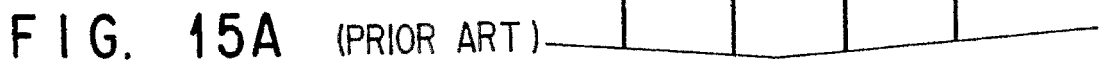
FIGS. 15A to 15F are waveform charts for explaining the correction circuit shown in FIG. 14.
Figure 15B:
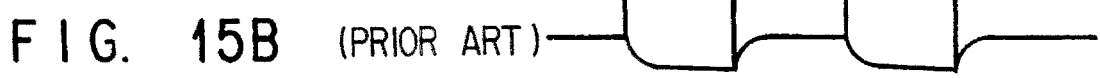
Figure 15C:
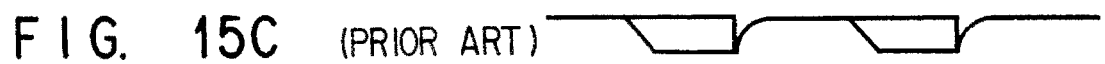
Figure 15D:
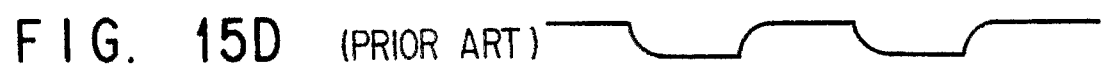
Figure 15E:
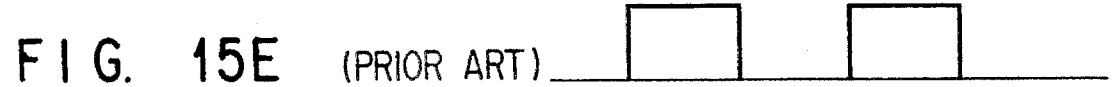
Figure 15F:
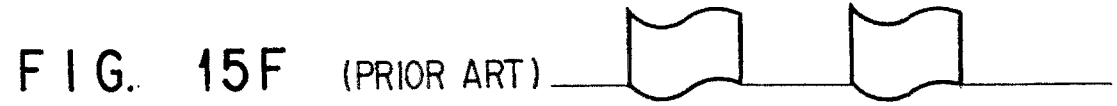

FIG. 7 is a circuit diagram showing the arrangement of the quantization circuit 25. In this case, the quantization circuit 25 is constituted by a comparator 25a, and its output amplitude is equal to that of the reproduced signal. More specifically, the comparator 25a outputs a signal of level "+1" when the input signal level is higher than zero level, or outputs a signal of level "−1" when the input signal level is lower than zero level.

The operation of the signal reproducing apparatus in FIG. 6 will be described below with reference to waveform charts as shown in FIGS. 8A to 8E. In FIGS. 8A to 8E, the waveform of the reproduced signal is indicated by its envelope. In some charts, an enlarged view is added on the right side.

FIG. 8A shows a ! signal reproduced from a magneto-optical disk device (not shown). In FIG. 8A, the blank portion of the magneto-optical signal by the blank (ID) portion at the sector head, a VFO portion as the recording portion of the highest frequency pattern to be written at the sector head, and part of a data portion as a recording portion subsequent to the VFO portion are shown. As shown in FIG. 8A, the signal reproduced from the magneto-optical disk has a DC offset due to birefringence of the disk or the like (high-frequency birefringence noise is omitted).

For the reproduced signal shown in FIG. 8A, its low-frequency component is removed by the HPF 21, and the DC offset is eliminated, as shown in FIG. 8B. However, a transient is generated at the head of the VFO portion or the like. This signal has a waveform as shown in FIG. 8C after passing through the adder 24 and the quantization circuit 25.

The signal with a generated transient becomes a transient correction signal from which a high-frequency component is removed through the LPF 23, as shown in FIG. 8D. This transient correction signal and an output from the HPF 21 shown in FIG. 8B are added by the adder 24. A signal as shown in FIG. 8E is obtained as a corrected reproduced signal.

In this manner, a transient correction signal without being affected by the noise component can be obtained on the basis of the output from the quantization circuit 25 (comparator 25a). When the time constant of the HPF 21 is set equal to that of the LPF 23, the frequency characteristics can be entirely flattened. For this reason, the corrected reproduced signal can be obtained without changing the reproduced signal waveform.

As described above, according to the fifth embodiment, the low-frequency component in the reproduced signal is removed by the HPF. In addition, the waveform correction circuit is constituted by combining the LPF having the same time constant as that of the HPF with the quantization circuit, thereby correcting the transient generated by the HPF. With this arrangement, only the low-frequency component can be removed without generating any transient. For this reason, even when binarization is performed by the DC slice method, an accurate result can be obtained.

The sixth embodiment of the present invention will be described below.

If the original modulation method is not DC-free, the ratio of the positive side to the negative side of a reproduced signal (the duty ratio is not 1:1) changes depending on a pattern. For this reason, the DC level (average value) of the reproduced signal is largely shifted from the center of the signal amplitude in some cases.

Generally, a signal reproduced from a magneto-optical disk has a limit in the MTF of the reproducing optical system or the band of the circuit. Therefore, the amplitude of the reproduced signal changes between a long pattern and a short pattern.

In the signal reproducing apparatus of the above-described fifth embodiment, the quantization circuit 25 in the waveform correction circuit 22 for correcting the transient is constituted by the simple comparator 25a. For this reason, the transient may not be accurately corrected for a waveform which cannot be regarded as a DC-free waveform. This can be improved by increasing the filter time constant. However, when the time constant is increased, the capability of removing the low-frequency noise is degraded.

The sixth embodiment solves this problem. More specifically, the quantization circuit is constituted by a circuit for ternarizing the signal reproduced from the magneto-optical disk. The constituent elements in the signal reproducing apparatus are the same as those in FIG. 6, and a detailed description thereof will be omitted.

The quantization circuit of the fifth embodiment outputs a signal of level "+1" when the input signal level is higher than zero level, or outputs a signal of level "−1" when the input signal level is lower than zero level. The quantization circuit of the sixth embodiment shown in FIG. 9 is constituted by a comparator circuit 25b in which a value (e.g., ±0.6 V) slightly larger than the amplitude of the reproduced signal (its amplitude is assumed to be ±1 V) at a high frequency is set as a threshold. The comparator circuit 25b outputs a signal of level "+1 V" when the input signal level is higher than the threshold on the positive side, or outputs a signal of level "−1 V" when the input signal level is lower than the threshold on the negative side. In addition, when the signal level is between the positive and negative thresholds, a signal of level "0 V" is output.

FIGS. 10A to 10E are charts showing the operational waveforms of the signal reproducing apparatus according to the sixth embodiment. As a reproduced signal waveform, a signal having an envelope as shown in FIG. 10A is assumed to be reproduced. In this case, only long patterns are concentrated on the positive side while only short patterns are concentrated on the negative side. In FIGS. 10B to 10E, as in the fifth embodiment, an output waveform from an HPF 21, an output from the quantization circuit 25 (comparator circuit 25b), an output from an LPF 23, and a corrected reproduced signal from the waveform correction circuit 22 are shown.

In a magneto-optical disk, the amplitude of the reproduced signal becomes small in a short pattern because of a limit in the MTF of the optical system. In this case, the signal rarely swings to the negative side. As a result, the central level of the reproduced signal is shifted from zero level.

When the quantization circuit (binary comparator 25a) of the fifth embodiment is used, as for only the output from the comparator 25a, the reproduced signal swings to the saturation level on the negative side. Therefore, the transient cannot be accurately corrected in some cases.

In the sixth embodiment, however, the ternary quantization circuit constituted by the comparator circuit 25b is used. For this reason, the output from the quantization circuit is close to the actual reproduced signal waveform, and more accurate correction can be performed.

As described above, according to the sixth embodiment, the quantization circuit 25 is constituted by the comparator circuit 25b as a ternarization circuit. For this reason, even in a pattern having a shift between the central value and zero level of the reproduced signal, correction can be performed, and the limit to a data pattern (modulation method) is minimized. To correct the reproduced signal having such a pattern by the correction circuit of the fifth embodiment, the time constant of the HPF must be increased. In the sixth embodiment, however, the reproduced signal can be corrected at a small time constant. As a result, the capability of removing low-frequency noise can be increased.

The quantization circuit is not limited to a ternarization circuit and may also be a circuit for quantizing a signal to four or more values. In multivalue quantization, the correction effect is increased although the circuit scale becomes larger.

The seventh embodiment of the present invention will be described below.

In the seventh embodiment, AGC (Auto Gain Control) is performed to align the amplitude of a reproduced signal. The waveform correction circuit according to the above-described fifth or sixth embodiment cannot accurately perform correction unless the amplitude of the reproduced signal and that of an output from the quantization circuit are in a predetermined ratio. Therefore, AGC of the reproduced signal must be performed at a stage before the waveform correction circuit.

FIG. 11 is a block diagram showing the arrangement of a signal reproducing apparatus for performing AGC.

An AGC circuit 26 is inserted between an HPF 21 and a waveform correction circuit 22 and receives an external AGC control signal. While the AGC control signal is active, the AGC circuit 26 sets the amplification factor of an amplifier (not shown) in the AGC circuit such that the amplitude of an output signal has a predetermined value. While the AGC control signal is inactive, the amplification factor of the amplifier is not changed (held at the preceding set value). To set the amplification factor, the amplitude of a received reproduced signal is detected by peak/bottom holding, and the gain of the amplifier in the AGC circuit 26 is controlled in accordance with the difference between the detected amplitude and the target amplitude.

A filter time constant switching signal is supplied to the HPF 21 and an LPF 23. When this switching signal goes active, the filters 21 and 23 are switched to small time constants. If the time constant in a normal operation is 10 µS, the time constant is switched to about 1 µS while the filter time constant switching signal is active.

FIGS. 12A to 12G are charts showing the operational waveforms of the signal reproducing apparatus with the arrangement in FIG. 11. When the reproduced signal as shown in FIG. 12A is received, the filter time constant switching signal as shown in FIG. 12C is set active in the VFO portion, and the time constants of the HPF 21 and the LPF 23 are switched to small values. For this reason, the transient at the head of the VFO portion, which is generated by the HPF 21, is immediately converged, as shown in FIG. 12B.

When the transient is almost converged, the AGC control signal shown in FIG. 12D goes active. After the transient is converged, the signal amplitude can be accurately detected by peak/bottom detection, and the AGC operation can be accurately performed. An output from a quantization circuit 25 has a waveform as shown in FIG. 12E.

The AGC operation is finished in the middle of the VFO portion. As shown in FIG. 12F, the filter time constant is also returned to the normal value before the DATA portion starts. With this operation, the corrected reproduced signal as shown in FIG. 12G can be obtained.

As described above, according to the seventh embodiment, the AGC circuit 26 for matching the signal amplitude is arranged between the HPF 21 and the waveform correction circuit 22. The filter time constant in the VFO portion is set to a value smaller than that in the DATA portion. The AGC operation is performed in accordance with the signal amplitude in the VFO portion. Therefore, the AGC operation can be accurately performed. In addition, since the signal amplitude is controlled to a predetermined value by AGC, the waveform correction circuit 22 can also be accurately operated.

In the above-described embodiments, a sum signal of the LPF output and the HPF output is quantized by the quantization circuit. However, the arrangement is not limited to this.

For example, in a signal reproducing apparatus according to the eighth embodiment as shown in FIG. 13, an output from an HPF 21 is quantized by a quantization circuit 25 and supplied to an LPF 23 in a waveform correction circuit 22'. A sum value of the output from the LPF 23 and the output from the HPF may be corrected by an adder 24 and output. With this arrangement, although the capability of correcting the transient of the waveform is slightly reduced, the operational stability is improved in some cases.

In addition, the present invention can be applied to not only a magneto-optical disk but also an optical disk of another type such as a phase change disk. Furthermore, the present invention can be applied to not only mark edge recording but also mark position recording.

According to the fifth to eighth embodiments of the present invention, the following arrangements can be obtained.

(1) A signal reproducing apparatus for an optical disk device, which reproduces an information signal from an optical disk in which data is recorded by mark edge recording such that a mark edge portion is caused to correspond to information "1", and a sector as a unit of data recording/ reproduction includes a VFO portion in which a specified pattern is recorded and a DATA portion in which the information signal is recorded, comprising an HPF for shielding a low-frequency component of a reproduced signal, and a waveform correction means for correcting a transient of the reproduced signal, which is generated by the HPF, wherein the waveform correction means includes a quantization means for quantizing a reproduced signal value, and an LPF having the same time constant as that of the HPF.

(2) A signal reproducing apparatus for an optical disk device according to the arrangement (1), wherein the waveform correction means has an addition means for adding an output from the HPF and an output from the LPF, and the quantization means receives an output from the addition means.

(3) A signal reproducing apparatus for an optical disk device according to the arrangements (1) and (2), wherein the quantization means quantizes the reproduced signal to three or more values.

(4) A signal reproducing apparatus for an optical disk device according to the arrangement (3), wherein the quantization means ternarizes the reproduced signal in accordance with a threshold larger than an amplitude of the reproduced signal at a highest frequency and smaller than the amplitude of the reproduced signal at a lowest frequency.

(5) A signal reproducing apparatus for an optical disk device according to the arrangements (1) to (4), wherein time constants of the HPF and the LPF in the VFO portion are set to values smaller than those in the DATA portion.

(6) A signal reproducing apparatus for an optical disk device according to the arrangements (1) to (5), further comprising an amplitude adjustment means, arranged between the HPF and the waveform correction means, for adjusting the amplitude of the reproduced signal to a predetermined value.

(7) A signal reproducing apparatus for an optical disk device according to the arrangement (6), wherein the amplitude adjustment means changes an amplification factor in accordance With the amplitude of the reproduced signal in the VFO portion.

According to the arrangement (1), a transient correction circuit capable of performing a high-speed operation without being affected by low-frequency noise can be realized, and only the low-frequency noise can be removed without changing the reproducing waveform. According to the arrangement (2), the entire frequency characteristics of the HPF and the waveform correction circuit are further flattened, so that transient correction can be further accurately realized. According to the arrangement (3), even when the reproduced signal is not DC-free, transient correction can be further stably performed, and the limit to the modulation method and the like can be minimized.

According to the arrangement (4), the waveform of the output from the quantization means is close to that of the reproduced signal, so that transient correction can be accurately and stably performed. According to the arrangement (5), the transient of the HPF output in the VFO portion is immediately converged by setting the time constant to a small value. For this reason, various signal processing operations using the VFO can be performed even at the stage before transient correction. According to the arrangement (6), the amplitude of the signal supplied to the waveform correction means is matched, so that transient correction can be accurately performed by the waveform correction means. According to the arrangement (7), with a relatively simple circuit arrangement, the amplitude of the signal supplied to the waveform correction means can be matched, and transient correction can be accurately performed.

As described above, according to the fifth to eighth embodiment of the present invention, a transient correction circuit capable of performing a high-speed operation without being affected by low-frequency noise and having a high correction capability can be realized. A signal reproducing apparatus for an optical disk device, which realizes a transient correction circuit capable of stably operating independently of a data pattern, can be provided. At the same time, a signal reproducing apparatus for an optical disk device, which realizes a transient correction circuit capable of further stably operating by introducing an AGC circuit, can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A magneto-optical recording apparatus having a reproducing waveform correction circuit, comprising:

a high-pass filter for removing a low-frequency component of a signal reproduced from a recording signal;

comparison means for comparing an output from said high-pass filter with a predetermined reference level, thereby generating a quantization output;

a low-pass filter for performing time integration of the quantization Output generated by said comparison means; and arithmetic means for arithmetically operating a correction output according to outputs from said high-pass filter and said flow-pass filter.

2. An apparatus according to claim 1, wherein said comparison means compares the reproduced signal with a plurality of reference levels and quantizes the reproduced signal to three or more values.

3. An apparatus according to claim 1, further comprising means for feeding back the output from said low-pass filter as the reference level of said comparison means.

4. An apparatus according to claim 3, further comprising means for decreasing a feedback amount as the reference level of said comparison means or setting the feedback amount to zero when an output level of said comparison means is set in the same level state during a predetermined time.

5. A magneto-optical reproducing apparatus having a reproducing waveform correction circuit, comprising:

a high-pass filter for removing a low-frequency component of a signal reproduced from a recording medium;

comparison means for comparing an output from said high-pass filter with a predetermined reference level, thereby generating a binary output;

a low-pass filter for performing time integration of the binary output generated by said comparison means; and arithmetic means for arithmetically operating a correction output according to outputs from said high-pass filter and said low-pass filter.

6. An apparatus according to claim 5, further comprising means for feeding back the output from said low-pass filter as the reference level of said comparison means.

7. An apparatus according to claim 6, further comprising means for decreasing a feedback amount as the reference level of said comparison means or setting the feedback amount to zero when an output level of said comparison means is set in the same level state during a predetermined time.

8. An apparatus according to claim 5, further comprising means for controlling an amplitude of an output from said comparison means and/or time constants of said high-pass filter and said low-pass filter on the basis of information of an amplitude or a frequency of the reproduced signal or information recorded in the disk.

9. An apparatus according to claim 5, wherein said arithmetic means comprises means for arithmetically operating an output corresponding to a difference between the output from said high-pass filter and the output from said low-pass filter.

10. An apparatus according to claim 5, further comprising level correction means for correcting a DC level of the output from said low-pass filter.

11. An apparatus according to claim 5, wherein said high-pass filter comprises a capacitor inserted in series with respect to the reproduced signal.

12. A signal reproducing apparatus for an optical disk device, which reproduces an information signal from an optical disk in which data is recorded by mark edge recording such that a mark edge portion is caused to correspond to information "1", and a sector as a unit of recording/reproduction of the data includes a first recording portion in which a specific pattern is recorded and a second recording portion in which information is recorded, comprising:

a high-pass filter for shielding a low-frequency component of a reproduced signal; and waveform correction means, which includes quantization means for quantizing a value of the reproduced signal, and a low-pass filter having substantially the same time constant as that of said high-pass filter, for correcting a transient of the reproduced signal, which is generated by said high-pass filter.

13. An apparatus according to claim 12, wherein said waveform correction means has addition means for adding an output from said high-pass filter and an output from said low-pass filter, and said quantization means receives an output from said addition means.

14. An apparatus according to claim 12, wherein said quantization means quantizes the reproduced signal to three or more values.

15. An apparatus according to claim 14, wherein said quantization means ternarizes the reproduced signal in accordance With a threshold larger than an amplitude of the reproduced signal at a highest frequency and smaller than the amplitude of the reproduced signal at a lowest frequency.

16. An apparatus according to claim 12, wherein the time constants of said high-pass filter and said low-pass filter in said first recording portion are set to values smaller than those in said second recording portion.

17. An apparatus according to claim 12, further comprising amplitude adjustment means, arranged between said high-pass filter and said waveform correction means, for adjusting an amplitude of the reproduced signal to a predetermined value.

18. An apparatus according to claim 17, wherein said amplitude adjustment means changes an amplification factor in accordance with the amplitude of the reproduced signal in said first recording portion.

* * * * *